United States Patent

[11] 3,611,160

[72] Inventor Jean Pierre Beauviala
3 Rue Hache, Grenoble, France

[21] Appl. No. 792,373
[22] Filed Jan. 21, 1969
[45] Patented Oct. 5, 1971
[32] Priority Jan. 26, 1968
[33] France
[31] 137494

[54] SIGNAL COMPARATOR
20 Claims, 7 Drawing Figs.

[52] U.S. Cl. 328/133, 307/215, 307/232, 307/233, 307/295, 318/601, 318/608
[51] Int. Cl. H03b 3/04, H03d 3/02, H03k 9/06
[50] Field of Search 307/232, 233, 220, 262, 295, 215; 328/109, 133, 134, 155; 324/82, 83; 329/110; 318/600–608

[56] References Cited

UNITED STATES PATENTS

| | | | |
|---|---|---|---|
| 2,795,695 | 6/1957 | Raynsford | 328/133 |
| 3,381,220 | 4/1968 | Burr | 324/82 |
| 3,382,376 | 5/1968 | Sowden | 328/133 X |
| 3,430,148 | 2/1969 | Miki | 307/295 X |
| 3,210,565 | 10/1965 | Rowe et al. | 307/215 |

*Primary Examiner*—Stanley D. Miller, Jr.
*Attorney*—Waters, Roditi, Schwartz & Nissen

ABSTRACT: A device for comparing the phase of a first and of a second pulselike electrical signal comprises a channel having at least two extreme binary elements coupled in cascade and capable of assuming a first or a second stable state, the first binary assembly comprising a first input and a first output for the first signal and a second input for the second signal, while the second binary assembly comprises a second input and a second output for the second signal and a first input for the first signal, the first output and the second input of the first binary assembly being respectively connected to the first input and to the second output of the second binary assembly, and at least one of the assemblies comprising a control output producing a signal indicating the state of said assembly, the first and second assemblies comprises first means responsive to the first signal to trigger the assemblies from the second state to the first state, or hold the assemblies in the first state, and second means responsive to the second signal to trigger the assemblies from the first state to the second or hold said assemblies in the second state, the first signal appearing at the first output only when the first assembly has triggered while the second signal appears at the second output only when the second assembly has triggered.

SIGNAL COMPARATOR

The present invention relates to devices for comparing the frequency and or phase of two electric signals, which may or may not be periodic.

Such devices are used in particular in servocontrol assemblies and, in this type of application, one is generally required to effect, in the case of periodic or pseudoperiodic signals, a comparison which furnishes the error signal of the servocontrol in two distinct channels, one of which effects what is known as "frequency search" and the other, what is known as "phase search."

This is due to the fact that the known devices which are capable of phasing two periodic or pseudoperiodic signals of this type generally operate correctly, only if the relative frequency shift between the two signals to be compared is small with respect to the period of said signals.

"The phase search channel" can therefore be used only when the "frequency search channel" has returned the frequency shift to a sufficiently low value. If, moreover, once the phase operation is reached, the instantaneous frequency of one of the two signals varies so that the frequency search channel has to operate, when the phase operation is again reached, a constant phase shift is often ascertained.

One of the objects of the invention is thus the production, with the aid of simple circuits, of a comparator capable of functioning both in phase search operation and in frequency search operation and of taking into account, once the phase operation is reached, the phase variations greater than one or even more periods, without any phase shift being produced.

Comparators have already been produced which are capable of more or less adequately fulfilling the above-mentioned conditions. In particular, certain known comparators comprise "bidirectional counters" of pulses, which are filled when the frequency of one of the two signals to be compared is higher than that of the other, and are emptied in the contrary case. A considerable difficulty is encountered, with these devices, when a pulse of one of the two signals appears at the same time as a pulse of the other: there is then a "risk," i.e. indetermination concerning the state of the device, and this risk can only be eliminated by the addition of complex systems of gates for delaying certain of the pulses and of memories.

Other known comparators comprise a ternary system, i.e. a system with three stable states corresponding for example to the levels 1,0 and −1; unfortunately these comparators are not well adapted to conventional "digital" arrangements in which the signals define only two logic levels.

The invention provides a purely binary comparator device, in which the "risks" mentioned above are avoided without the use of complicated circuits.

If a line is considered, along which two signals, applied respectively to the two ends of the line, may propagate in opposite directions, it is obvious that this propagation will be translated by the transfer, along the line, of two disturbances in the electrical state of said line, starting respectively from the ends and meeting one another. It is then possible, by observing the development of the electrical state of the line at one or more predetermined points, to deduce therefrom the instants when the two disturbances occur at these points, thus the relative phase or frequency of the two signals.

According to the invention, the device intended for comparing the phase of a first and of a second pulselike electric signal, is characterized in that it comprises a channel comprising at least two extreme binary elements mounted in cascade and capable of assuming a first or a second stable state, the first binary assembly comprising a first input and a first output for the first signal and a second input for the second signal, while the second binary assembly comprises a second input and a second output for the second signal and a first input for the first signal, the first output and the second input of the first binary assembly being respectively connected to the first input and the second output of the second, and at least one of said assemblies comprising a control output on which appears a signal signifying the state of said assembly, the first and the second assemblies comprising first means in order that the first signal causes them to trigger from the second state to the first or holds them in said first state and, second means in order that the second signal causes them to trigger from the first state to the second or holds them in said second state, said first signal appearing at said first output only when the first assembly has triggered, while the second signal appears at said second output only when the second assembly has triggered.

Thus, the signals may propagate in the two opposite directions of the channel, until they "meet." The significant signal derived from the control output thus indicates the phase difference of one of the signals with respect to the other. In order that different phase shifts may be measured, the channel of the device according to the invention preferably comprises, between said first and second extreme binary assemblies mentioned above, at least one intermediate binary assembly capable of assuming the first and second stable states and comprising a first input and a first output for the first signal, and a second input and a second output for the second signal, the first input and the second output being respectively connected to the first output and to the second input of the preceding assembly and the first output and the second input being respectively connected to the first input and to the second output of the following assembly, and at least one of said intermediate assemblies comprising a control output on which appears a signal signifying the state of said assembly, this latter comprising first means in order that the first signal causes it to trigger from the second state to the first or holds it in said first state and, second means in order that the second signal causes it to trigger from the first state to the second or holds it in said second state, said first signal appearing at said first output only when said intermediate assembly has triggered, while the second signal appears at the second output only when said intermediate assembly has triggered.

Each of the extreme and intermediate assemblies preferably comprises a binary decision element and two other binary elements connected together so as to constitute a trigger circuit.

In order to permit the phase and/or frequency comparison of two AC electric signals, the comparator device advantageously comprises, in addition, between each of the extreme binary assemblies and the input of said AC signals, a device for forming pulses from said latter.

The binary assemblies and the pulse-forming devices are advantageously formed by combinations of NAND or NOR gates. Thus, the signals to be compared, after the forming of pulses of calibrated width and of suitable polarities are respectively applied to the two extreme assemblies of the register and it is the binary state of one of the intermediate assemblies which constitutes the output signal of the comparator.

The different advantages which result from this structure, as well as other particularities of the invention, will clearly appear with the aid of the following detailed description, in the attached drawings.

Figure 1:
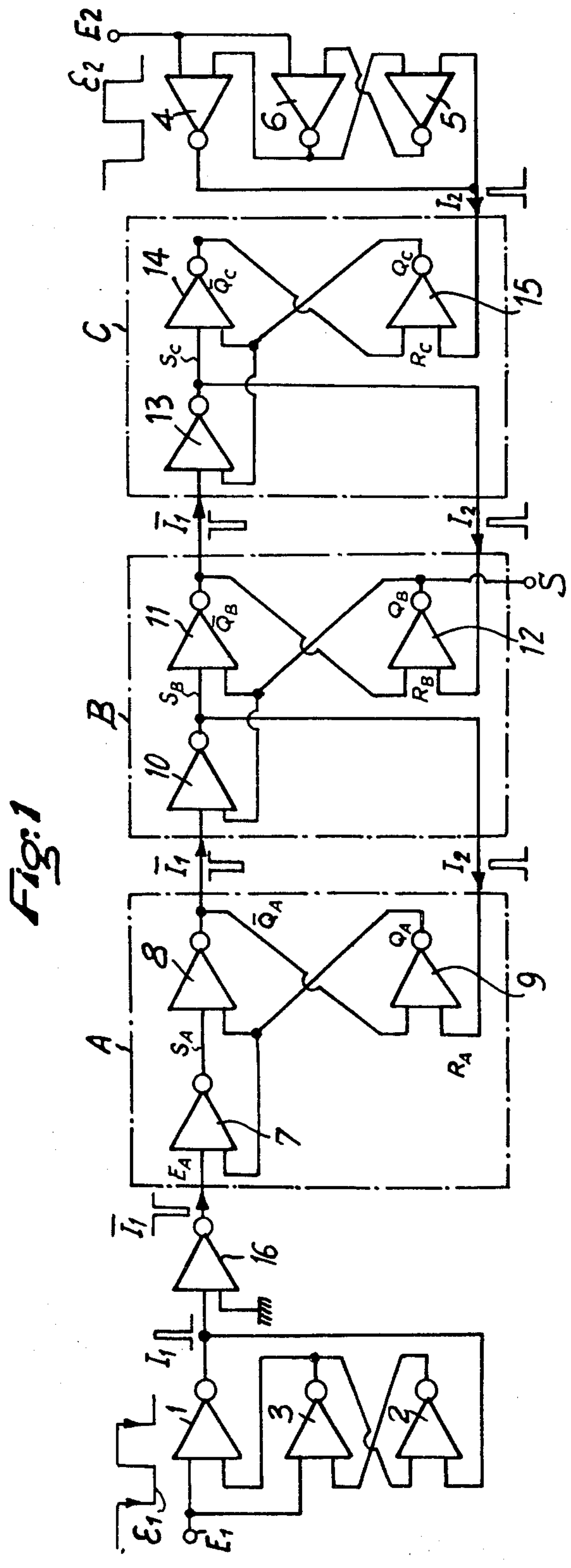
FIG. 1 is a diagram of a comparator according to an embodiment of the invention, whose register comprises three binary assemblies.

The comparator device shown in FIG. 1 essentially comprises: three basic elements A, B, C; between a left-hand input E1 and the element A, a first pulse-forming device constituted of three NOR gates 1, 2, 3, and between a right-hand input E2 and the element C, a second pulse forming device constituted of three NOR gates 4, 5 and 6.

Each of the basic elements is constituted of three NOR gates 7, 8 and 9 for the element A; 10, 11 and 12 for the element B; 13, 14 and 15 for the element C. The output S of the device is the output of the gate 12. The pairs of gates 2 and 3, 8 and 9, 11 and 12, 14 and 15 are connected so as each to constitute a bistable trigger circuit, the output of each gate of a pair being connected to an input of the other gate of the pair.

In the first pulse-forming device, the input E1 is connected to an input of each of the gates 1 and 3, and the output of the gate 1 is connected to an input of the gate 2.

The second pulse-forming device is mounted in the same manner as the first. An input of the gate 7 of the element A is connected to the output of the gate 1 by means of a gate 16 mounted in a logic changeover switch. The other input of the gate 7 is connected to the connection between the output of the gate 9 and the input of the gate 8. The output of the gate 8 is connected to an input of the gate 10 of the element B, while the input of the gate 9 not connected to the output of the gate 8 is connected to the output of the gate 10. The elements B and C are mounted in the same manner, but the output of the gate 4 of the pulse-forming device is directly connected, without the aid of a logic changeover switch, to the input of the gate 15 of the device C.

The operation of the device will now be explained, assuming that two battlement-shaped electric signals $\epsilon 1$ and $\epsilon 2$, of respective frequencies F1 and F2, are respectively applied to the inputs E1 and E2. These signals are firstly shaped in order to obtain pulses of suitable width and polarity, and this is the role of the devices 1, 2, 3 and 4, 5, 6.

If for example, the propagation of the signal $\epsilon 1$ is examined, it will be seen that the first falling wave edge is shown by the appearance of a logic signal of level "1," at the output I1 of the gate 1. This signal "1," applied to an input of the gate 2 due to the connection between the gates 1 and 2 produces signal "0" at the output of the gate 2, thus a signal "1" at the output of the gate 3. This signal, reapplied to the second input of the gate 1 causes said latter to trigger again. This therefore results in the appearance of a wave edge of level "0" on I1, delayed with respect to the preceding wave edge 1, with a time equal to the sum of the propagation times in the three gates, hence the production of a pulse I1 of level "1" and of width equal to said time. The pulse-forming device is reset, i.e. is returned to its initial state upon the passage of the signal $\epsilon 1$ to the level "1."

The gate 16 produces negative pulses $\overline{I1}$ in the example in question, where the level "1" is positive.

The trigger circuit 8–9 of the element A has two complementary outputs $\overline{QA}$ and QA; according to the state of these outputs one may define a first stable state which will be designated as state "X," for which $\overline{QA}$=0 and QA=1, and a second stable state which will be designated as state "$\overline{X}$" for which $\overline{QA}$=1 and QA=0.

If upon the arrival of $\overline{I1}$ at the input EA of the gate 7, the element A and the other downstream elements B and C are in state X, the gate 7 is saturated since QA=1 and the states of the registers A, B, C, are not changed by the arrival of $\overline{I1}$, are thus likewise modified with respect to the propagation from upstream to downstream.

If, on the other hand, the element A is in state $\overline{X}$, the gate 7 is open: the pulse I1 transformed into its complement $\overline{I1}$ by the gate 7 then causes the trigger circuit 8–9 to pass to state X. If all the downstream elements are also in state X, the propagation stops: in other words, the trigger circuit of the element A has acted as a memory with respect to the event $\epsilon 1$ presented in the form of $\overline{I1}$.

If on the other hand the element B were also in state $\overline{X}$, the transition of the element A to state X has for its effect to apply a level "0" to the input of the gate 10, thus a level "1" to the input of the gate 11, so that the trigger circuit 11–12 passes to state X. However, for its part, the element A is returned to state $\overline{X}$: in fact, the output SB of the gate 10 passes into state 1, this causing 8–9 to trigger by applying a level 1 to its input RA.

Thus it is finally seen that the pulse $\overline{I1}$ propagates downstream of the register up to the last element which was previously in state $\overline{X}$: on this latter element there is imposed state X, which it retains in memory, while the preceding elements are all returned to state $\overline{X}$. The propagation of the pulse $\overline{I1}$ stops either at the element, of which the one following (downstream) is in state X, or at the end of the register. This propagation is "free," in the sense that it depends solely upon the states assumed by the successive elements of the register under the action of such signals to be propagated and not of synchronization pulses which would be imposed by an outside clock.

If the propagation of the signals $\epsilon 2$ is now examined, it is firstly obvious that a pulse I2, of width equal to the sum of the propagation times in the gates 4, 5, 6, is applied to the input RC of the gate 15. Since in this direction of propagation the pulses do not meet changeover components between the trigger circuits, it is the state $\overline{X}$ which will be transferred successively to the trigger circuits of the register, by rising upstream again, until either a trigger circuit, which is saturated with respect to the opposite direction of propagation, i.e. upstream, located in state $\overline{X}$, or the end of the register is met. At this moment, state $\overline{X}$ will be registered in the trigger circuit preceding (downstream) the saturated trigger circuit, while all the trigger circuits preceding (downstream) will be returned to state X.

The cases will now be considered where a plurality of signals arrive successively at one of the inputs: if one starts from a register whose three trigger circuits are in state X, thus saturated with respect to the direct propagation the application of three successive pulses I2 will saturate it with respect to the opposite propagation, i.e. will cause three trigger circuits to pass into state $\overline{X}$. If, on the other hand, one starts from a register which is saturated with respect to the reverse propagation, the application of three successive pulses $\overline{I1}$ will saturate it with respect to the direct propagation. In short, it may be said that the signals $\epsilon 1$ produce state X, while the signals $\epsilon 2$ produce state $\overline{X}$.

If the frequency F1 is clearly higher than the frequency F2, the permanent operation of the register is state X. However, upon each input of a pulse I2, state $\overline{X}$ is registered in C and after propagation, i.e. in a period of time momentarily negligible with respect to the period 1/F1 or 1/F2 (the time of propagation through one of the gates is for example equal to 20 nanoseconds, while the period of the pulses is a 20 microseconds for a frequency of 50 kHz.), the state $\overline{X}$ is transferred to A. The state $\overline{X}$ remains stored in A until the appearance of the following pulse $\overline{I1}$ and it is then replaced by state X. There is thus a switching of the trigger circuit 8–9 at the frequency F1–F2, but on the other hand, the elements B and C are practically permanently in state X: a signal of level 1 will therefore be derived at S. In fact, the trigger circuit 11–12 passes to state $\overline{X}$ only during the brief instants of the transfer of the pulses I2, which, as has been shown above, are negligible with respect to the time gaps during which said trigger circuit is in state X. The transfer pulses which appear at S thus do not modify in practice the average value of the state stored in the trigger circuit 11–12.

A similar reasoning shows that a signal of level 0 is collected at S when F2 is clearly higher than F1. In this case, it is the trigger circuit 14–15 which is switched to the frequency F2–F1.

The mode of operation which has just been described will be designated hereinafter as "frequency search operation" in order to recall the fact that, when the comparator forms part of a servo loop, it operates in this manner as long as the frequency gap remains considerable.

A signal 0 or 1 is then transmitted to the other elements of the servo loop and this signal, as will be seen later with reference to a practical servocontrol diagram, constitutes an error signal which has for its effect to control a reduction in the frequency shift. Thus a moment occurs when this shift which has become small, constitutes a phase shift and oscillates about a central value which is that to which the loop is adjusted; in other words, the servocontrol tends to return the phase to this central value. When it moves away therefrom in one direction or another, the comparator must then supply a signal having a parameter which will serve for the control, varying as a function of the shift, according to a predetermined law, defined by the servocontrol. It is most often question of a law of proportionality. This second mode of operation of the comparator will be designated as "phase-measuring operation."

Figure 2:
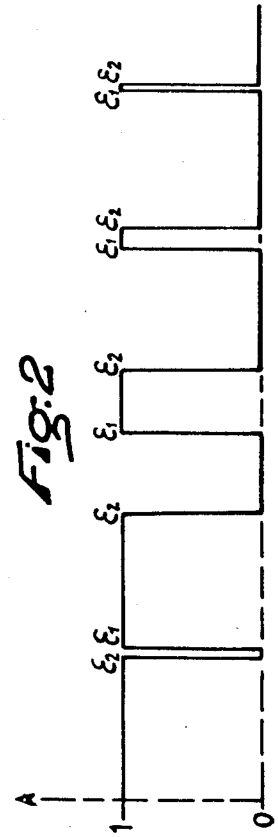
FIG. 2 shows the amplitude variation of the output signal of the comparator as a function of time during the phase operation.

FIG. 2 shows the development of the output signal of the comparator (terminal S) during the time when the frequency F2, assumed to be constant, the frequency F1, firstly slightly greater than F2, decreases until it becomes lower than F2.

Therefore one obviously starts from a situation in which the register is saturated in state X (F1>F2), in order to reach a situation in which the register is saturated in state $\bar{X}$ (F1<F2).

In the intermediate situation (F1=F2), there is simply a phase shift between the signals $\epsilon 1$ and $\epsilon 2$. As soon as this phase shift is slightly negative (i.e. $\epsilon 1$ is slightly delayed with respect to $\epsilon 2$), the pulse I2 arrives at the register slightly before the pulse $\bar{I1}$, it passes through C which is in state X and produces state $\bar{X}$, on B and stops there since A=$\bar{X}$, but the pulse $\bar{I1}$ which follows, passes through A and reestablishes state X on B, then stops, since C=X.

As the phase shift continually increases, it may be seen that the time gaps $\epsilon 2-\epsilon 1$ during which the element B is in state $\bar{X}$ are continually greater, while the time gaps $\epsilon 1-\epsilon 2$ during which the register is in state X are continually smaller until they are annulled when the phase shift is $-2\pi$.

In other words, during the time gap from phase shift 0 to phase shift $-2\pi$, the ratio between the time gaps where the output of the comparator is at level 0, and the time gaps where it is at level 1, is proportional to the phase shift: one therefore has the desirable control parameter, as defined hereinabove. This gap (0,$-2\pi$) corresponds to the phase-measuring range: the servo loop will obviously be adjusted to the central value $-\pi$.

The preceding explanation does not take into account the fact that the downstream and upstream propagation speeds may be slightly different. If the difference between the downstream and upstream propagation times reaches for example the maximum of 20 nanoseconds, the maximum error on the phase measurement will be of the order of 1 percent for a signal frequency of 500 kHz., this constituting a remarkable performance.

Between $+2\pi$ and 0 on the one hand, and between $-2\pi$ and $-4\pi$, on the other hand, the comparator is an intermediate operation, between the frequency search operation and the phase measurement operation. In this intermediate operation, either the element A or element C are alternately assigned to state X, then state $\bar{X}$, and there is no longer collected at S a signal modulated in width proportionally to the phase shift.

However, the servocontrol does not stop operating, since the signal S is then practically constant and of level 0 or 1 suited for controlling the suitable phase variation. This intermediate operation is distinguished from the frequency search operation in that no pulse arrives on a register which is already saturated. In other words, either the element A or element C momentarily changes state upon the input of each pulse, as in the phase measurement operation, while in the frequency search operation there is no change of state each time that two successive pulses arrive at the same input E1 or E2.

In the phase measurement operation and the intermediate operation, the output signal could be derived from the memory of any one of the three elements A, B or C, and one of these elements could even be eliminated if need be, since this would be sufficient for eliminating the hazard of "risk" due to the appearance of two pulses $\bar{I1}$ and I2 at the same time and in phase. It is not the same case in the frequency search operation, where it is indispensable, if it is desired to eliminate all indetermination, to enframe the element B from which the signal is derived by two elements A and C: even if the state of one of these protector elements becomes beating, the element B continues to supply a suitable control signal.

In the case where the servo loop is adjusted to a central value corresponding to a zero phase shift, four elements A, B1, B2, C are used, which are constituted and connected in the same manner as elements A, B and C of FIG. 1.

Figure 3:
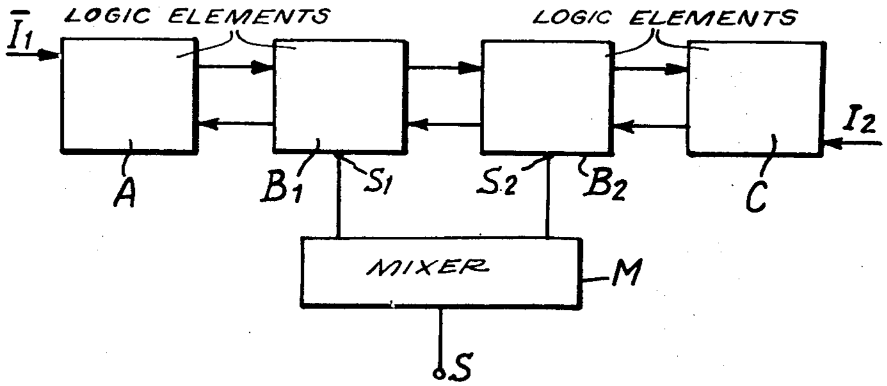
FIG. 3 is a diagram, in the form of functional units, of a register with four binary assemblies.
Figure 4:
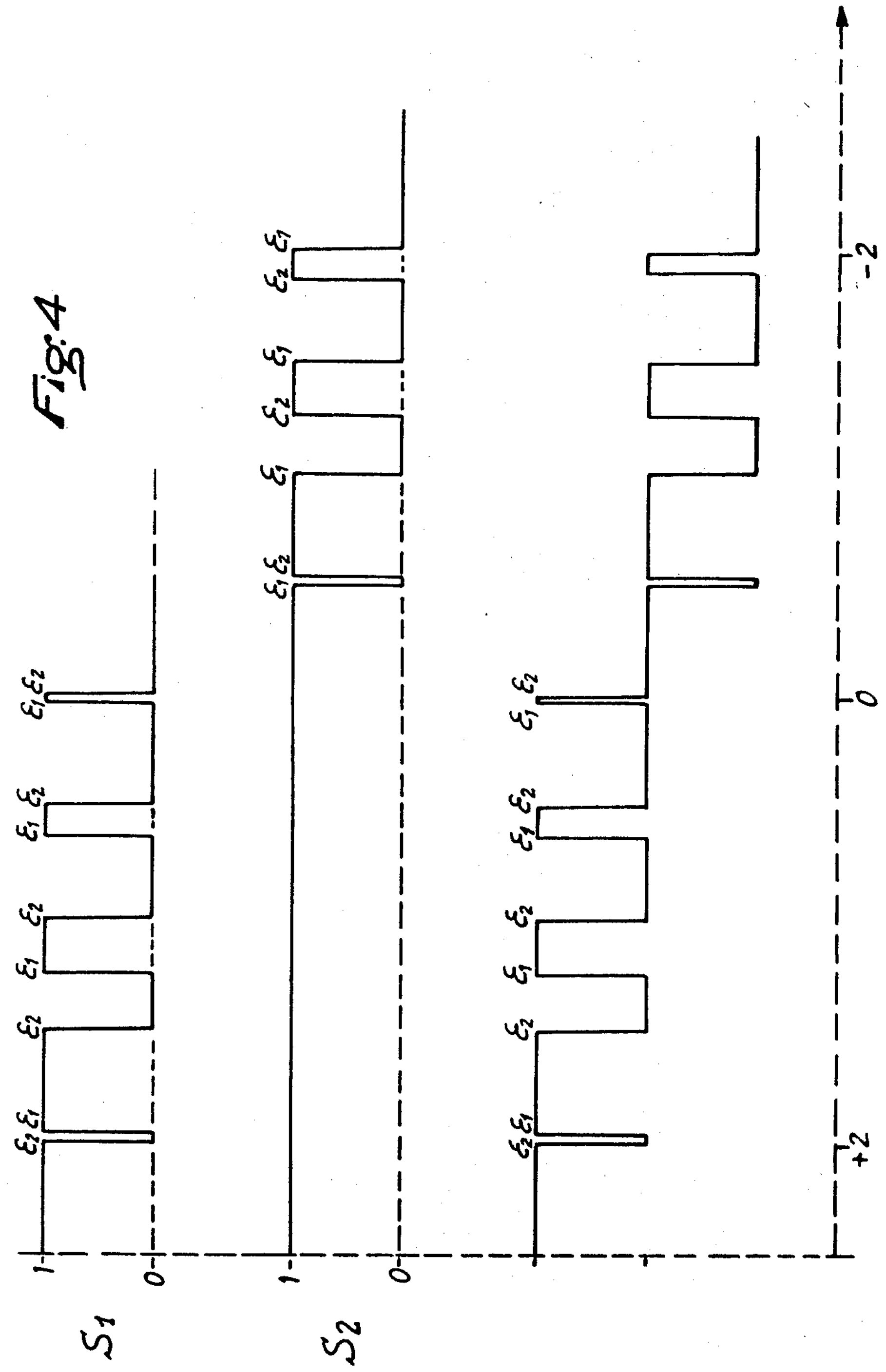
FIG. 4 shows the variation as a function of time of the output signals of the intermediate assemblies and of their sum, in the register of FIG. 3.

FIG. 3 schematically shows a register of this type, while FIG. 4 illustrates the operation thereof. For a phase shift between 0 and $2\pi$, there is, at the output S1 of the element B1, a signal (S1) identical to the signal picked up at the output S of the element B of FIG. 1 in phase operation. Another identical signal (S2) appears at the output S2 of the element B2 when the phase shift is between 0 and $-2\pi$. A digital mixer circuit M, of a type known per se, enables the signal (S) to be obtained at the output S of the comparator.

It is obvious that by adding to the register other elements B3, B4 and C, to which different weights may moreover be attributed (i.e., a nonlinear mixture obeying a predetermined law could be made in the device M), a comparator could be produced which may be used in a servo loop obeying said predetermined law, the phase search operation then being obtained in a wide range of shifts with respect to the central value of the phase.

Figure 5:
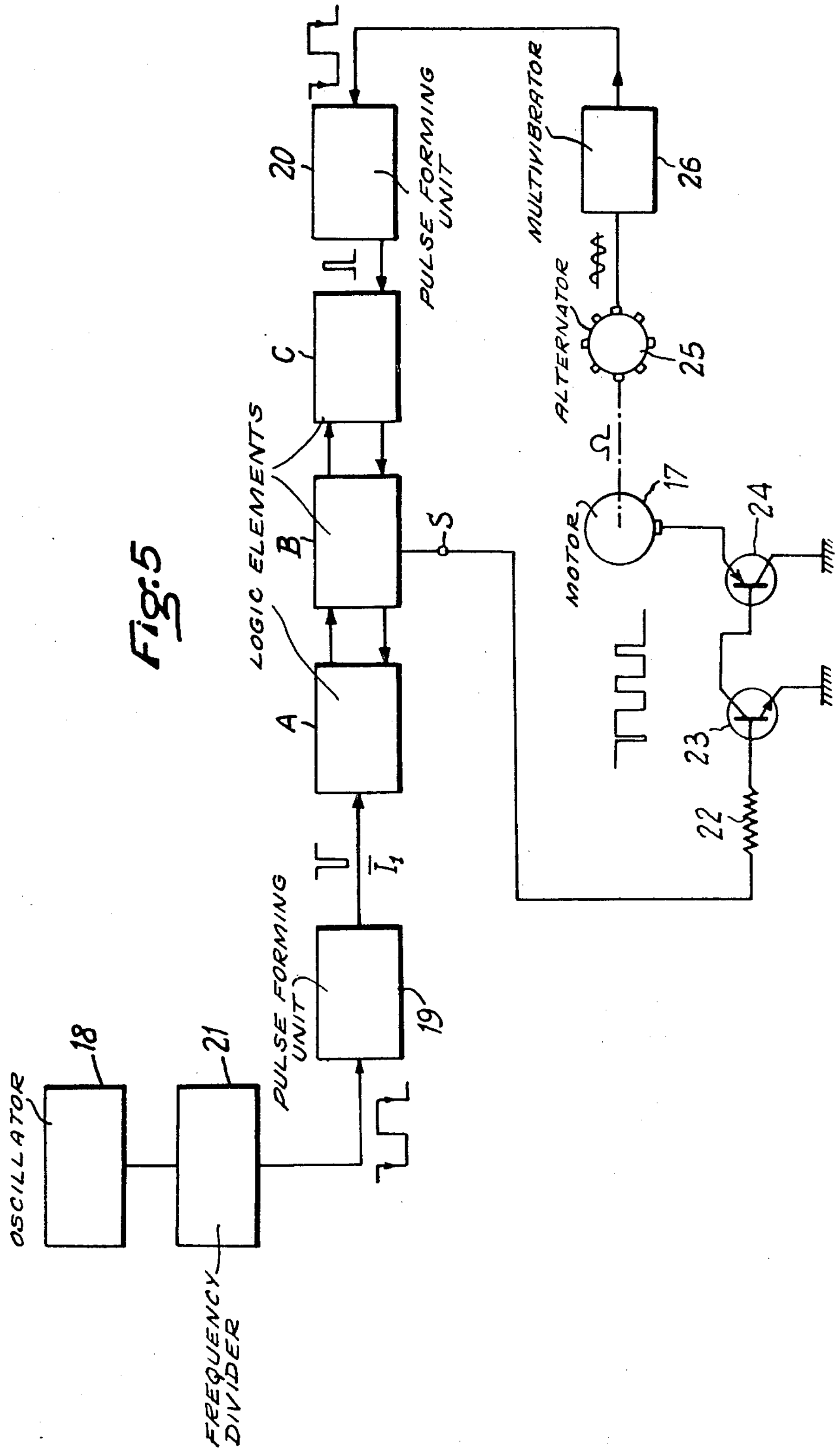
FIG. 5 is the diagram of a device for servocontrolling the speed of a motor, comprising a comparator according to the invention.

By way of example of application of the invention, FIG. 5 shows a device for controlling the speed of a motor 17 by the frequency of a quartz oscillator 18.

This device comprises a comparator of the type shown in FIG. 1, which has been shown schematically by its element A, B, C and its two pulse-forming devices 19 and 20.

The oscillator 18 feeds the device 19 by means of a frequency divider by N designated by the reference number 21.

The output S of the element B is connected to the motor by means of a resistor 22 and of two transistors 23 and 24 having conductivities of opposite types (for example NPN and PNP respectively). The motor drives a trachometric alternator 25 whose sinusoidal output voltage, of frequency proportional to the speed of the motor after battlements are formed by a multivibrator 26, is applied to the device 20.

Such a servocontrol is conventional, the invention relating to the comparator and its incorporation in an assembly, which moreover is known, for the purpose of obtaining both the speed search and phase search.

For a motor rotating for example at 1,500 r.p.m. and an alternator with 24 poles, the frequency F2 applied at 20 is 600 Hz. With the quartz oscillating at 600 kHz. for example, it is sufficient to take N=1,000 in order to obtain F1 0 F2.

The transistors 23 and 24 act as a switching ballast: the mean current which controls the speed of the motor is thus proportional to the width of the battlements of the signal at S, thus to the phase shift. They could obviously be replaced by any suitable device for conversion into analog signals, with the output voltage of the comparator.

In the frequency search operation, from the start, F1>>F2 and the level 1, applied to the ballast, saturates it, this having for its effect to accelerate the motor. As soon as it exceeds the speed fixed by the servocontrol, F2>F1 and the level 0 applied to the ballast, blocks said latter, this having for its effect to decelerate the motor.

Figure 6:
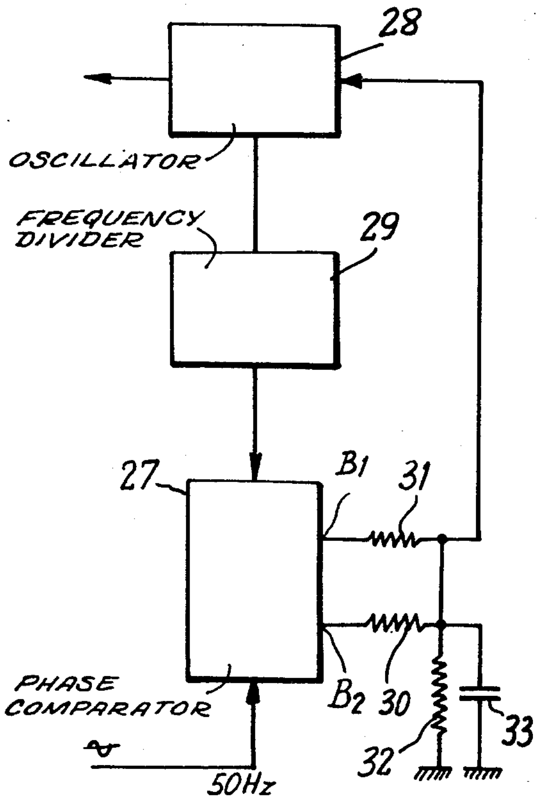
FIG. 6 is the diagram of a device for servocontrolling the line-scanning oscillator for a television receiver and, FIG. 7 shows, by way of example, a diagram of a binary element capable of being used in the comparator according to the invention.

FIG. 6 shows a servocontrol device, at the frequency of the supply mains applied to an input of a phase comparator 27, of the oscillator 28 which defines the line scanning frequency of a television receiver.

Such an assembly is conventional per se: the frequency of the oscillator 28 is divided, in a device 29, by a coefficient such that two frequencies of 50 Hz. are applied to the respective inputs of the comparator.

This latter is preferably of the type shown in FIG. 3, the mixture being constituted of three resistors 30—31—32 and by a filtering capacitor 33.

As the comparator comprises 4 elements A, B1, B2 and C, the phase is adjusted to a central value of zero. It may be shown that this results in an easier filtering (by the capacitor 33) of the output signal of the comparator.

Of course, the applications described hereinabove are in no way limiting; in particular, the comparator according to the invention will be able to serve for comparing both numbers of pulses and the frequency and phase of analog signals, hence its possible applications to the control of machine-tools.

It must be understood that in the diagram of FIG. 1, the NOR circuits could be replaced by NAND circuits, by suitably modifying the polarities. More generally, the basic element (such as A, FIG. 1) of the device may be produced by any means which enable a decision function to be produced, which is equivalent to that fulfilled by the changeover device (such as 7) and a memory function such as that fulfilled by the trigger circuit (8–9), these two functions being interconnected in the manner described above.

It is obvious that the pulse-forming devices may be omitted each time that the input signals appear in the form of calibrated pulses of suitable polarities. The only condition imposed on these devices which may be produced in various known manners, is that the widths of the calibrated pulses I1 and I2 which they produce are respectively smaller than five times and four times the propagation time through one of the gates (generally identical) which constitute the register proper, this being so in order to avoid a change of state being produced at the output of the changeover device (such as 7, FIG. 1) under the action of the trailing edge of the pulse I1 or I2.

Figure 7:
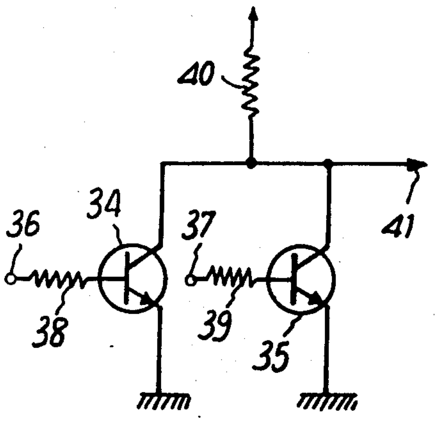

It may be observed that the gates (such as 8 and 9 of FIG. 1) may be very simply produced: FIG. 7 shows, by way of example, a NOR gate produced in known manner by means of two transistors 34 and 35. The two inputs 36 and 37 of the gate are made on the bases of the transistors, by means of resistors 38 and 39 respectively. The level 1 is applied to the common collectors (voltage V) through a resistor 40 and the output is derived at 41.

What I claim is:

1. Device for comparing the phase of a first and of a second pulselike electrical signal, comprising a channel having at least two extreme binary elements coupled in cascade and capable of assuming a first or a second stable state, the first binary assembly comprising a first input and a first output for the first signal and a second input for the second signal, while the second binary assembly comprises a second input and a second output for the second signal and a first input for the first signal, the first output and the second input of the first binary assembly being respectively connected to the first input and to the second output of the second binary assembly, and at least one of said assemblies comprising a control output producing a signal indicating the state of said assembly, the first and the second assemblies comprising first means responsive to the first signal to trigger said assemblies from the second state to the first or hold said assemblies in said first state, and second means responsive to the second signal to trigger said assemblies from the first state to the second or hold said assemblies in said second state, said first signal appearing at said first output only when the first assembly has triggered while the second signal appears at said second output only when said second assembly has triggered.

2. Device as claimed in claim 1, wherein each of the binary assemblies comprises a binary decision element and two other binary elements connected together to form a trigger circuit.

3. Device as claimed in claim 2, wherein the binary decision element of each binary assembly is a gate having two inputs, one of said two inputs connected to the output of the first of the two other binary elements forming the trigger circuit of the preceding assembly, the other input of said two inputs of said gate is connected to the output of the second binary element of the trigger circuit in said binary assembly and the output of said gate being connected to an input of the first binary element of the trigger circuit in said binary assembly, the input of said first binary element being connected to an input of the second of the two binary elements of the trigger circuit of the preceding assembly.

4. Device as claimed in claim 3, wherein said binary elements are formed of NAND gates.

5. Device as claimed in claim 3, wherein said binary elements are formed of NOR gates.

6. Device as claimed in claim 3, comprising two extreme binary assemblies and at least two intermediate binary assemblies, and means for making a digital mixture of the signals indicating the state of said intermediate assemblies derived from the corresponding outputs of said intermediate assemblies.

7. Device as claimed in claim 1 for permitting the phase and/or frequency comparison of two AC electric signals, comprising between each of the extreme binary elements and the input of the AC signals, a device for forming pulses from said AC signals.

8. Device as claimed in claim 8, wherein each pulse-forming device comprises three gates of the same type as those which form said binary elements, said three gates being connected in series.

9. Servocontrol device comprising a comparator device as claimed in claim 1, a generator of a reference frequency connected to one of the two inputs of the comparator, means for transforming the output signal of the comparator into a signal for controlling the phenomenon to be servo-controlled, and means connected to the other input of the comparator, for measuring the frequency of said phenomenon.

10. Servocontrol device as claimed in claim 9 comprising a frequency divider connecting said other input to said means for measuring the frequency of said phenomenon.

11. Device for comparing the phase of a first and a second pulselike electrical signal, comprising a channel having at least two extreme binary elements capable of assuming a first or second stable state, the first binary assembly comprising a first input and a first output for the first signal and a second input for the second signal, while the second binary assembly comprises a second input and a second output for the second signal and a first input for the first signal and, between said first and second extreme binary assemblies at least one intermediate binary assembly capable of assuming the first and second stable states and comprising a first input and a first output for the first signal and a second input and a second output for the second signal, a preceding and a following binary assembly the first input and the second output of the intermediate assembly being respectively connected to the first output and to the second input of said preceding binary assembly and the first output and the second input of the intermediate assembly being respectively connected to the first input and to the second output of said following binary assembly, and at least one of said intermediate preceding or following assemblies comprising a control output producing a signal indicating the state of said assembly, each of the binary assemblies comprising first means responsive to the first signal to trigger said binary assembly from the second state to the first or maintain said binary assembly in said first state and, second means responsive to the second signal to trigger said binary assembly from the first state to the second or maintain said binary assembly in said second state, said first signal appearing at said first output only when said assembly has triggered, while the second signal appears at said second output only when said intermediate assembly has triggered.

12. Device as claimed in claim 11 wherein each of the binary assemblies comprises a binary decision element and two other binary elements connected together to form a trigger circuit.

13. Device as claimed in claim 12 wherein the binary decision element of each binary assembly is a gate having two inputs, one of said two inputs connected to the output of the first of the two other binary elements forming the trigger circuit of the preceding assembly, the other input of said two inputs of said gate connected to the output of the second binary element of the trigger circuit in said binary assembly and the output of said gate being connected to an input of the first binary element of the trigger circuit in said binary assembly, the input of said first binary element being connected to an input of the second of the two binary elements of the trigger circuit of the preceding assembly.

14. Device as claimed in claim 13 wherein said binary elements are formed of NAND gates.

15. Device as claimed in claim 13 wherein said binary elements are formed of NOR gates.

16. Device as claimed in claim 12 comprising two extreme binary assemblies and at least two intermediate binary assemblies, and means for making a digital mixture of the signals indicating the state of said intermediate assemblies derived from the corresponding outputs of said intermediate assemblies.

17. Device as claimed in claim 10 for permitting the phase and/or frequency comparison of two AC electric signals, comprising between each of the extreme binary elements and the input of the AC signals, a device for forming pulses from said AC signals.

18. Device as claimed in claim 17 wherein each pulse-forming device comprises three gates of the same type as those which form said binary elements, said three gates being connected in series.

19. Servocontrol device comprising a comparator device as claimed in claim 10, a generator of a reference frequency connected to one of the two inputs of the comparator, means for transforming the output signal of the comparator into a signal for controlling the phenomenon to be servo-controlled, and means connected to the other input of the comparator, for measuring the frequency of said phenomenon.

20. Servocontrol device as claimed in claim 19 comprising a frequency divider connecting said other input to said means for measuring the frequency of said phenomenon.